United States Patent
Liu et al.

(10) Patent No.: US 10,191,708 B2
(45) Date of Patent: Jan. 29, 2019

(54) METHOD, APPARATRUS AND COMPUTER-READABLE MEDIUM FOR DISPLAYING IMAGE DATA

(71) Applicant: Beijing Xiaomi Mobile Software Co., Ltd., Haidian District, Beijing (CN)

(72) Inventors: Huayijun Liu, Beijing (CN); Tao Chen, Beijing (CN); Ke Wu, Beijing (CN)

(73) Assignee: BEIJING XIAOMI MOBILE SOFTWARE CO., LTD., Haidian District, Beijing ( * ) Notice: Subject to any disclaimer, the term of this patent is extended or adjusted under 35 U.S.C. 154(b) by 57 days.

(21) Appl. No.: 15/461,473

(22) Filed: Mar. 16, 2017

(65) Prior Publication Data

US 2017/0286039 A1 Oct. 5, 2017

(30) Foreign Application Priority Data

Mar. 30, 2016 (CN) .......................... 2016 1 0195626

(51) Int. Cl.
| | | |
|---|---|---|
| H04N 5/232 | (2006.01) | |
| G06F 3/147 | (2006.01) | |
| G06F 3/14 | (2006.01) | |
| G06F 1/16 | (2006.01) | |

(Continued)

(52) U.S. Cl.
CPC ............. *G06F 3/14* (2013.01); *G02B 27/017* (2013.01); *G06F 1/163* (2013.01); *G06F 3/147* (2013.01);
(Continued)

(58) Field of Classification Search
CPC . G06F 3/14; G06F 3/147; G06F 1/163; G02B 27/017; G02B 2027/014;
(Continued)

(56) References Cited

U.S. PATENT DOCUMENTS 9,727,184 B2 * 8/2017 Cho ........................ G06F 3/044
9,729,522 B2 * 8/2017 McCoy ................. H04L 9/3226
(Continued)

FOREIGN PATENT DOCUMENTS

| CN | 103888639 A | 6/2014 |
|---|---|---|
| CN | 103945107 A | 7/2014 |

(Continued)

OTHER PUBLICATIONS

International Search Report of PCT/CN2016/097641.
Extended European Search Report for EP Application No. 17151419.3 dated on Jul. 17, 2017.

*Primary Examiner* — Hung H Lam
(74) *Attorney, Agent, or Firm* — Jun He Law Offices P.C.; James J. Zhu (57) ABSTRACT

A method, apparatus and computer-readable medium for displaying image data are provided, which pertains to the field of computer technology. The method comprises: determining current spatial position information and attitude information of the terminal and establishing a data connection between the terminal and a wearable device when detecting that an image-capturing component of a terminal is turned on; and sending image data captured by the image-capturing component to the wearable device for displaying the image data synchronously when the current spatial position information and attitude information of the terminal meet a preset condition that is disadvantageous for viewing a screen of the terminal.

15 Claims, 3 Drawing Sheets

```
determining current spatial position information and attitude information of a      ─ 201
terminal, and establishing a data connection between the terminal and a wearable
device when detecting that an image-capturing component of the terminal is turned
on
```

```
sending image data captured by the image-capturing component to the wearable        ─ 202
device for displaying the image data synchronously when the current spatial
position information and attitude information of the terminal meet a preset
condition that is disadvantageous for viewing a screen of the terminal
```

(51) Int. Cl.
*G02B 27/01* (2006.01)
*H04W 4/80* (2018.01)

(52) U.S. Cl.
CPC ... *H04N 5/23203* (2013.01); *G02B 2027/014* (2013.01); *G02B 2027/0138* (2013.01); *G02B 2027/0178* (2013.01); *G02B 2027/0187* (2013.01); *H04W 4/80* (2018.02)

(58) Field of Classification Search
CPC .... G02B 2027/0138; G02B 2027/0178; G02B 2027/0187; H04N 5/23203; H04W 4/80
See application file for complete search history.

(56) References Cited

U.S. PATENT DOCUMENTS

| | | | | |
|---|---|---|---|---|
| 2014/0191929 A1* | 7/2014 | Kim | ...................... | G06F 3/1454 345/8 |
| 2014/0273849 A1* | 9/2014 | Lee | ...................... | G06F 1/1694 455/41.2 |
| 2014/0334271 A1* | 11/2014 | Park | ...................... | G04G 21/04 368/10 |
| 2015/0015459 A1 | 1/2015 | Cho et al. | | |
| 2015/0208141 A1* | 7/2015 | Kim | ...................... | G08C 17/02 340/870.07 |

FOREIGN PATENT DOCUMENTS

| | | |
|---|---|---|
| CN | 104156138 A | 11/2014 |
| CN | 104317393 A | 1/2015 |
| CN | 104950448 A | 9/2015 |
| CN | 105120099 A | 12/2015 |
| CN | 105162976 A | 12/2015 |
| CN | 105187707 A | 12/2015 |
| CN | 105279924 A | 1/2016 |
| CN | 105847627 A | 8/2016 |
| EP | 1001618 A1 | 5/2000 |
| JP | 2009118474 A | 5/2009 |

* cited by examiner

FIG. 1

201 — determining current spatial position information and attitude information of a terminal, and establishing a data connection between the terminal and a wearable device when detecting that an image-capturing component of the terminal is turned on 202 — sending image data captured by the image-capturing component to the wearable device for displaying the image data synchronously when the current spatial position information and attitude information of the terminal meet a preset condition that is disadvantageous for viewing a screen of the terminal

METHOD, APPARATRUS AND COMPUTER-READABLE MEDIUM FOR DISPLAYING IMAGE DATA

CROSS-REFERENCE TO RELATED APPLICATION

This application is based upon and claims priority to Chinese Patent Application No. 201610195626.1 filed on Mar. 30, 2016, the disclosure of which is incorporated herein by reference in its entirety.

FIELD

The present disclosure relates to the field of computer technology, and more particularly to a method, apparatus and computer-readable medium for displaying image data.

BACKGROUND

With the development of computer technology, camera pixels of a mobile phone is becoming higher and higher, and since mobile phones are easily to carry; a user is enabled to carry a mobile device conveniently and to capture images of interest. After images are captured with the mobile, the user may also share the images with friends in time, so that more and more people prefer to use mobile phones to capture images.

In some shooting situations, when a user uses a mobile phone to capture images, due to the shooting angle, the user might be unable to see the viewfinder image displayed on a screen of the mobile phone, only blind shot is available, for example, a user captures images with a mobile phone, when the distance between the mobile phone and the ground is relatively small, and that shooting photographing direction of the mobile phone and the vertical upward direction has a relatively small angle, blind shot (shooting without looking into the viewfinder image) or lying on the ground for shooting is needed, resulting in poor image quality of the captured images.

SUMMARY

According to a first aspect of the present disclosure, a method for displaying image data is provided. The method comprises: current spatial position information and attitude information of the terminal is determined and a data connection between the terminal and a wearable device is established when detecting that an image-capturing component of a terminal is turned on; image data captured by the image-capturing component is sent to the wearable device for displaying the image data synchronously when the current spatial position information and attitude information of the terminal meet a preset condition that is disadvantageous for viewing a screen of the terminal.

According to a second aspect of the present disclosure, an apparatus for displaying image data is provided. The apparatus comprises a processor; and a memory for storing processor-executable instructions. Wherein the processor is configured to: determine current spatial position information and attitude information of a terminal and establish a data connection between the terminal and a wearable device when detecting that an image-capturing component of the terminal is turned on; and send image data captured by the image-capturing component to the wearable device for displaying the image data synchronously when the current spatial position information and attitude information of the terminal meet a preset condition that is disadvantageous for viewing a screen of the terminal.

According to a third aspect of embodiments of the disclosure, a non-transitory computer-readable storage medium having instructions stored thereon is provided. The instructions, when executed by a processor, cause the processor to perform a method for displaying image data, the method comprises: when detecting that an image-capturing component of a terminal is turned on, determining current spatial position information and attitude information of the terminal, and establishing a data connection between the terminal and a wearable device; and sending image data captured by the image-capturing component to the wearable device for displaying the image data synchronously when the current spatial position information and attitude information of the terminal meet a preset condition that is disadvantageous for viewing a screen of the terminal.

It should be understood that both the forgoing general description and the following detailed description are exemplary only, and are not restrictive of the present disclosure.

BRIEF DESCRIPTION OF THE DRAWINGS

The accompanying drawings herein, which are incorporated in the specification and constitute a part thereof, illustrate embodiments consistent with the present disclosure, and explain the principles of the present disclosure together with the specification, in the drawings.

By the above drawings, precise embodiments of the present disclosure have been shown, and will be described in more detail hereinafter. These figures and description are not intended in any way to limit the disclosed concept, but to explain concept described in this disclosure to those skilled in the art by reference to specific embodiments.

DETAILED DESCRIPTION

Reference will now be made in detail to exemplary embodiments, whose examples are illustrated in the accompanying drawings. When refereeing to the accompanying drawings, the same reference number in different drawings refers to same or similar elements, unless otherwise indicated. The implementations set forth in the following exemplary embodiments do not represent all implementations consistent with the present disclosure. Instead, they are merely examples of apparatuses and methods consistent with aspects related to the disclosure as recited in the appended claims.

Figure 1:
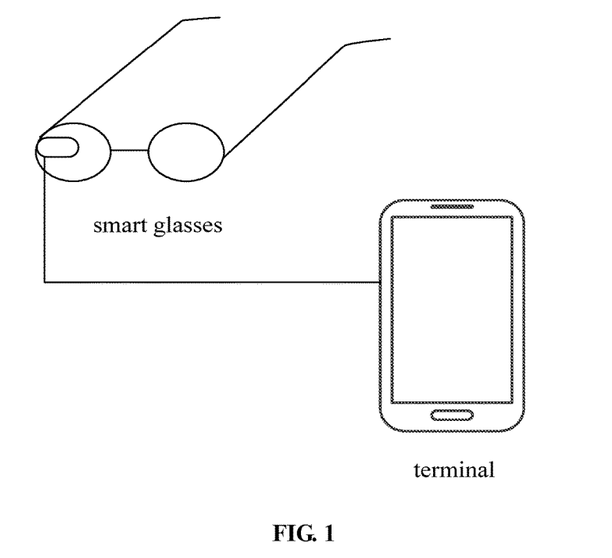
FIG. 1 is a scene graph according to an exemplary embodiment.

An exemplary embodiment of the present disclosure provides a method for displaying image data, the image data display method may be jointly implemented by a terminal and a wearable device, as shown on FIG. 1. A displaying image data system may comprise a terminal and a wearable device, wherein the terminal may be a mobile phone, a tablet, and the like. The terminal may be provided with a processor, a memory, a transceiver, an image-capturing component, a Bluetooth component, and the like. The processor may be used for process of displaying image data. The memory may store data needed during the process of capturing images and the received data; the transceiver may receive and transmit messages; the image-capturing component may be a camera in the terminal for capturing images. The Bluetooth component may communicate with the wearable device. The terminal may also comprise input and output devices such as a screen and the like, the screen may display the captured image, the screen may be a touch screen. The terminal may also be equipped with a wearable device application (may be referred to as a management app), which may be used by a user to manage wearable device. The wearable device may be smart glasses, the wearable device may be provided with a processor, a memory, a transceiver, a Bluetooth component, a control button, etc. The processor may be used for process of displaying image data; the memory may store data needed during the process of capturing images and the received data; the transceiver may receive and transmit messages. The image-capturing component may be a camera in the terminal for capturing images. The Bluetooth component may communicate with the wearable device, the control button may be used to control operations of the user wearable device. In the present embodiment, a mobile phone and wearable smart glasses are taken as examples of terminals to provide a detailed description of the program, and other cases are similar, which are not elaborated in the present embodiment.

Before implementation, a user may install the management app, then the management app may be turned on. The terminal, on the other hand, may display a management app login screen. The user may enter an account and a password, then click OK button to trigger the terminal to display a main interface of the management app. The main interface has adding options among other options; the user may click the adding option to trigger the terminal to find nearby devices via Bluetooth. The terminal may display Bluetooth identifications of all found devices in an interface, the user may click on the Bluetooth identification option of the wearable device that is intended be bound, so as to trigger the terminal to store the Bluetooth identification option of the wearable device that is intended be bound. In this way the terminal completes the binding with the wearable device.

Figure 2:
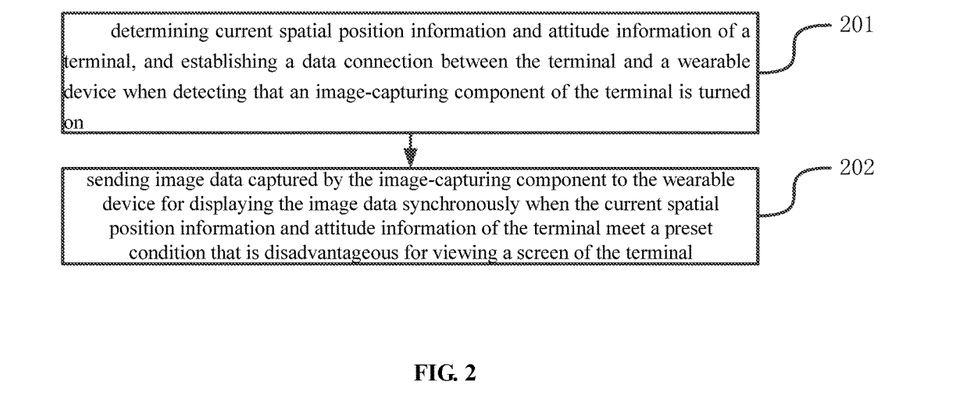
FIG. 2 is a flow diagram illustrating a method for displaying image data according to an exemplary embodiment.

As shown in FIG. 2, process flow of the method may comprise the following steps.

In step 201, when an image-capturing component of a terminal is detected to be turned on, current spatial position information and/or attitude information of the terminal is determined, and a data connection between the terminal and a wearable device is established.

In an embodiment, a user may bind the terminal to a wearable device in advance, and may carry the wearable device (e.g., wearing smart glasses) with himself/herself. When seeing an image of interest, the user may turn on the terminal image-capturing component. A system program in the terminal may detect whether the image-capturing component is turned on, and when the image-capturing component is detected to be turned on, the component for determining spatial position information and/or attitude information of the terminal may be turned on, to determine spatial position information and/or attitude information of the terminal. Further, when the image-capturing component is detected to be turned on, the terminal may send a data connection request to the bound wearable device (i.e., the wearable device to which the Bluetooth identification stored by the terminal corresponds), upon receiving the data connection request, the wearable devices may feed a data connection success message back to the terminal, upon receiving the data connection success message sent by the wearable device, the terminal may establish a data connection with the wearable device, so that the terminal is enabled to send captured image data to the wearable device.

Alternatively, an infrared sensors and a gyroscope may be used to determined current spatial position information of the terminal and current attitude information of the terminal respectively, as will be detailed below.

When the image-capturing component is detected to be turned on, the current spatial position information of the terminal is determined via the infrared sensor.

Additionally or independently, when the image-capturing component is detected to be turned on, the current attitude information of the terminal is determined via the gyroscope.

Wherein the spatial position information is the distance between the terminal and the ground (may be an obstacle just under the terminal), and attitude information is the angle between vertical upward direction and shooting direction of the image-capturing component of the terminal.

In practice, an infrared sensor may be set in a terminal, the infrared sensor may be set next to an image-capturing component of the terminal, and the infrared sensor may be used to determine spatial position of the present terminal. When the image-capturing component is detected by a system program to be turned on, the infrared sensor may be turned on. The infrared sensor may determine current spatial position information of the terminal, for example, firstly the following time period is determined: the time period from the time infrared lights of the infrared sensor begin to propagate and reach the ground and other obstructions to reflect back, to the time when the reflected infrared lights are received by the infrared sensor; and the distance between the infrared sensor and the ground may be determined as follows: the obtained time period is multiplied with the propagation velocity of infrared light and divided by two, so as to obtain the distance between the infrared sensor and the ground.

Additionally or independently, a gyroscope may be set in a terminal, and the gyroscope may be used to determine attitude information of the present terminal. When the image-capturing component is detected by a system program to be turned on, the gyroscope may be turned on, and the gyroscope may measure angular velocity of rotation of the terminal, and then calculate the angle between vertical upward direction and shooting direction of the image-capturing component of the current terminal based on the angular velocity of rotation.

In addition, the method for determining spatial position information of the current terminal is not limited to an infrared sensor, and the method for determining attitude information of the current terminal is not limited to a gyroscope, the above methods are just possible implementations, any component that is capable of determining spatial position information and attitude information of the present terminal may serve as specific implementation, the present disclosure does not make any specific limitation.

In step 202, if the current spatial position information and/or attitude information of the terminal meets a preset condition that is disadvantageous for viewing a screen of the terminal, then image data captured by the image-capturing component is sent to the wearable device to enable the wearable device to display the image data synchronously.

In practice, a condition that is disadvantageous for viewing a screen of a terminal may be preset and stored in the terminal. For example, a condition that is disadvantageous for viewing a screen of a terminal may be that the distance from the ground is less than a predetermined distance threshold value, etc. Image data captured by the image-capturing component is the image data of the picture displayed on the screen of the terminal when the image-capturing component is turned on.

If either one of the current spatial position information and the attitude information meets a preset condition that is disadvantageous for viewing a screen of the terminal, the terminal may send the image data captured by the image-capturing component (i.e., the image data of the picture displayed on the screen of the terminal when the image-capturing component is turned on) to the wearable device connected thereto. Upon receiving the image date sent by the terminal, the wearable device may display the image simultaneously.

Alternatively, the spatial position information is a distance between the terminal and the ground, and the attitude information is an angle between vertical upward direction and shooting direction of the image-capturing component of the terminal. The process of step 102 may be implemented as follows.

The image data captured by the image-capturing component is sent to the wearable device when the distance between the terminal and the ground is less than a predetermined distance threshold value, and/or that the angle between vertical upward direction and shooting direction of the image-capturing component of the terminal is less than a predetermined angle threshold value.

Wherein the image data captured by the image-capturing component is the image data of the picture displayed on the screen of the terminal when the image-capturing component is turned on.

In practice, the spatial position information may be the distance between the terminal and the ground (may be an obstacle just under the terminal). Specifically, it may be the distance between central position of the terminal and the ground. The attitude information is the angle between vertical upward direction and shooting direction of the image-capturing component of the terminal. A technician may preset the distance between a terminal and the ground terminal (i.e., the preset distance threshold value, for example, 50 cm), and storage the distance in the terminal. The angle between vertical upward direction and shooting direction of the image-capturing component of the terminal (i.e., the preset angle threshold value, for example, 60 degrees) may also be preset and stored the angle in the terminal.

When the distance between the terminal and the ground is less than a predetermined distance threshold value, or the angle between vertical upward direction and shooting direction of the image-capturing component of the terminal is less than a predetermined angle threshold value, the terminal may send the image data captured by the image-capturing component to the wearable device bound thereto. Upon receiving the image date sent by the terminal, the wearable device may display the image simultaneously. For example, if a user want to take a side view of relatively short flowers, it is necessary to squat down so that the image-capturing component of the terminal and flowers are at the same horizontal plane. In such situation, the distance between the terminal and the ground is relatively small, when it is less than a predetermined distance threshold, the terminal may send the image data captured by the image-capturing component to smart glasses bound thereto. Upon receiving the image date sent by the terminal, the smart glasses may display the image simultaneously.

Figure 3:
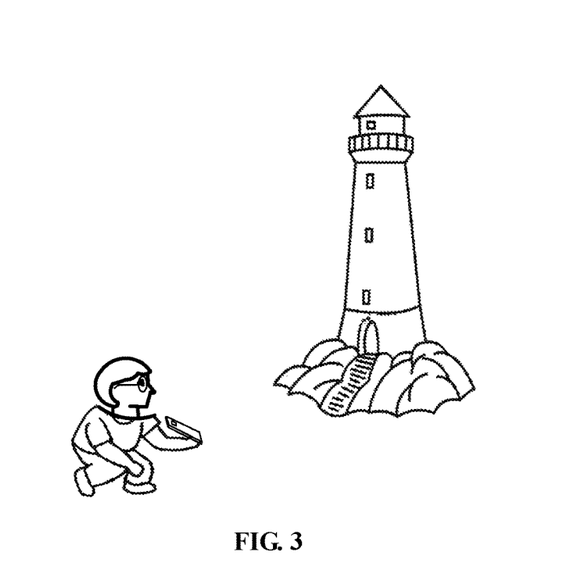
FIG. 3 is a shooting scene graph of a method for displaying image data according to an exemplary embodiment.

When the distance between the terminal and the ground is less than a predetermined distance threshold value, and the angle between vertical upward direction and shooting direction of the image-capturing component of the terminal is less than a predetermined angle threshold value, the terminal may send the image data captured by the image-capturing component to the wearable device bound thereto. Upon receiving the image date sent by the terminal, the wearable device may display the image simultaneously. For example, as shown in FIG. 3, a user is currently standing below a tower and using a mobile phone to capture an image of the tower. Since the tower is relatively high, if the user wants to capture an image of it, he or she needs to squat down to the ground or lie on the ground so that the distance between the mobile phone and the ground is relatively small. Further, the mobile phone is still needed to shoot from a lower angle. In this way, the distance between a terminal and the ground is less than a predetermined distance threshold value, and an angle between vertical upward direction and shooting direction of the image-capturing component of the terminal is less than a predetermined angle threshold value. The terminal may send the image data captured by the image-capturing component to smart glasses bound thereto. Upon receiving the image date sent by the terminal, the smart glasses may display the image simultaneously.

Alternatively, there are two kinds of ways for a terminal to send the image data captured by the image-capturing component to smart glasses bound thereto: sending the image data captured by the image-capturing component to the wearable device via a Bluetooth component; or sending the image data captured by the image-capturing component to the wearable device via a wireless network.

In practice, a terminal and a wearable device may be provided with Bluetooth components. A Bluetooth component may be used for communication between the terminal and the wearable device.

When it is determined that the current spatial position information and/or attitude information meets a preset condition that is disadvantageous for viewing a screen of the terminal, the image data captured by the image-capturing component may be sent to the wearable device via a Bluetooth component.

Alternatively, the terminal and the wearable device may be provided with wireless communication modules. A wireless communication module may be used for communication between the terminal and the wearable device. A user may set the wearable device and the terminal to access a same wireless network in a management app. A user may trigger to turn on the management app, then click on option of "my device" to make the terminal display wearable devices bound thereto. A user may click on option of "wearable device(s)" to make option of network connection, delete option, and etc. to be display. A user may click option of network connection to make multiple wireless network options to be displayed. A user may click o option of the wireless network that is desired to be connected to make the terminal displays a password input box. A user may enter password for the wireless network, and then click OK button to make the wearable device to access the wireless network, that is, to record an identification of the wireless network.

When it is determined that the current spatial position information and/or attitude information meets a preset condition that is disadvantageous for viewing a screen of the terminal, the image data captured by the image-capturing component may be sent to the wearable device via a wireless network. For example, when the terminal and the wearable device are in a same Wifi (Wireless Fidelity) network, the image data captured by the image-capturing component may be sent to the wearable device via the Wifi network.

Embodiments of the present disclosure also provide a method in which a wearable device controls a terminal to perform capturing process, the corresponding process may be: receiving an image-capturing request sent by the wearable device for performing an image-capturing process; or receiving a recording request sent by the wearable device for performing a recording process.

In practice, a control button may be set on a wearable device. The control button may be used to send an image-capturing request to a terminal when the wearable device detects that a user clicks the control button to input trigger command. The control button may be set anywhere on the wearable device. For example, if the wearable device is smart glasses, the control button may be set on the glasses frame. When a user is satisfied with the image displayed on a wearable device, he or she may click the control button of the wearable devices to make it send an image-capturing request to the terminal to which it connected. Upon receiving the image-capturing request, the terminal may perform an image-capturing process.

Alternatively, a control button may be set on a wearable device. The control button may be used to send a recording request to a terminal when the wearable device detects that a user double clicks the control button to input trigger command. The control button may be set anywhere on the wearable device. For example, if the wearable device is smart glasses, the control button may be set on the glasses frame. When a user is satisfied with the image displayed on a wearable device, he or she may double-click the control button of the wearable devices to make it send a recording request to the terminal to which it connected. Upon receiving the recording request, the terminal may perform a recording process.

Embodiments of the present disclosure also provide a method for stopping sending the image data captured by the image-capturing component to the wearable device, the corresponding process may be: stopping sending the image data captured by the image-capturing component to the wearable device, when the spatial position information and/or attitude information of the terminal no longer meets the preset condition that is disadvantageous for viewing a screen of the terminal.

In practice, when the spatial position information or attitude information of the terminal no longer meets the preset condition that is disadvantageous for viewing a screen of the terminal, it is indicated that a user is capable of viewing the image of the image-capturing component via the screen of the terminal, the terminal no longer sends the image data captured by the image-capturing component to the wearable device. For example, when a user is standing below a tower, and wants to capture an image of a friend after capturing an image of the tower. In such a situation, the terminal determines that the spatial position information and/or attitude information of the terminal no longer meets the preset condition that is disadvantageous for viewing a screen of the terminal, and may stop sending the image data captured by the image-capturing component to the wearable device.

Alternatively, when the spatial position information and attitude information of the terminal no longer meet the preset condition that is disadvantageous for viewing a screen of the terminal, it is indicated that a user is capable of viewing the image of the image-capturing component via the screen of the terminal, the terminal no longer sends the image data captured by the image-capturing component to the wearable device.

Furthermore, embodiments of the present disclosure also provide a method for a user to set conditions that are disadvantageous for viewing a screen of the terminal, the corresponding process may be as follows.

A user may install a management app on the terminal, and may turn on the management app, then he or she may click setup option on an interface to make the terminal display conditions that are disadvantageous for viewing screen of the terminal, as well as some other setup option. A user may click an option of the conditions that are disadvantageous for viewing screen of the terminal, to make conditions that are disadvantageous for viewing screen of the terminal and adding options to be displayed. A user may click a certain option of a condition that is disadvantageous for viewing screen of the terminal, to make the terminal display editing option and deleting option. When a user wants to editing condition that is disadvantageous for viewing a screen of the terminal, he or she may click the editing option to make the terminal display an editing box to which the spatial position information corresponds and an editing box to which the attitude information corresponds. A user may, in the editing box to which the spatial position information corresponds, edit the spatial position information set previously and input first spatial position information. The user may also, in the editing box to which the attitude information corresponds, edit the attitude information set previously and input first attitude information. After this, the user then clicks OK button to make the terminal store the edited condition disadvantageous for viewing screen of the terminal. If a user wants to delete the condition disadvantageous for viewing screen of the terminal, he or she may click the deleting option to make the terminal to delete such condition.

A user may also click the adding option to make the terminal display an input box to which the spatial position information corresponds and an input box to which the attitude information corresponds. The user may enter second spatial position information and second attitude information in the input box to which the spatial position information corresponds and an input box to which the attitude information corresponds respectively. After this, the user then clicks OK button to make the terminal store the edited condition disadvantageous for viewing screen of the terminal.

In embodiments of the present disclosure, when an image-capturing component of a terminal is detected to be turned on, current spatial position information and/or attitude information of the terminal is determined, and a data connection between the terminal and a wearable device is established. Image data captured by the image-capturing component is sent to the wearable device when the current spatial position information and/or attitude information of the terminal meets a preset condition that is disadvantageous for viewing a screen of the terminal, enabling the wearable device to display the image data synchronously. In this way, in the situation that the terminal is disadvantageous for a user to view its screen, the terminal may send the captured image data to a wearable device. The user may view captured image form the wearable device so see whether such image satisfying. The user may also adjust attitude and position of the terminal based on the viewed image data, thereby improving the quality of captured images.

Figure 4:
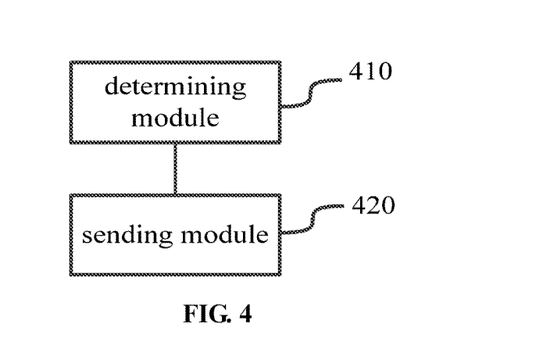
FIG. 4 is structure block diagram illustrating a device for displaying image data according to an exemplary embodiment.

Another exemplary embodiment of the present disclosure provides an apparatus for displaying image data. As shown in FIG. 4, the apparatus comprises a determining module 410 and a sending module 420. The determining module 410 is for determining current spatial position information and/or attitude information of the terminal and for establishing a data connection between the terminal and a wearable device when an image-capturing component of a terminal is detected as being turned on. The sending module 420 is for sending image data captured by the image-capturing component to the wearable device when the current spatial position information and/or attitude information of the terminal meets a preset condition that is disadvantageous for viewing a screen of the terminal, enabling the wearable device to display the image data synchronously.

Optionally, the determining module 410 is for: determining the current spatial position information of the terminal via an infrared sensor when the image-capturing component is detected to be turned on; and/or determining the current attitude information of the terminal via a gyroscope when the image-capturing component is detected to be turned on.

Optionally, the spatial position information is a distance between the terminal and the ground, and the attitude information is an angle between vertical upward direction and shooting direction of the image-capturing component of the terminal. The sending module 420 is for: sending the image data captured by the image-capturing component to the wearable device, when the distance between the terminal and the ground is less than a predetermined distance threshold value, and/or that the angle between vertical upward direction and shooting direction of the image-capturing component of the terminal is less than a predetermined angle threshold value.

Optionally, the sending module 420 is for: sending the image data captured by the image-capturing component to the wearable device via a Bluetooth component; or sending the image data captured by the image-capturing component to the wearable device via a wireless network.

Figure 5:
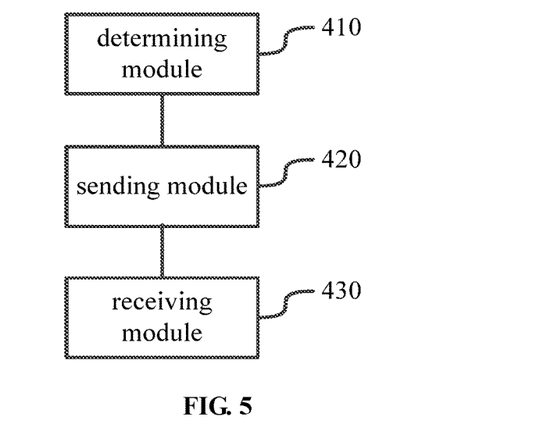
FIG. 5 is structure block diagram illustrating a device for displaying image data according to an exemplary embodiment.

Optionally, as shown in FIG. 5, the apparatus further comprises a receiving module 430. The receiving module 430 is for: receiving an image-capturing request sent by the wearable device for performing an image-capturing process; or receiving a recording request sent by the wearable device for performing a recording process.

Figure 6:
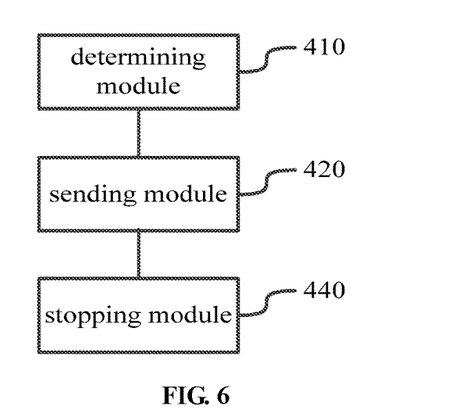
FIG. 6 is structure block diagram illustrating a device for displaying image data according to an exemplary embodiment.

Optionally, as shown in FIG. 6, the apparatus further comprises a stopping module 440. The stopping module 440 is for: stopping sending the image data captured by the image-capturing component to the wearable device when the current spatial position information and/or attitude information of the terminal no longer meets the preset condition that is disadvantageous for viewing a screen of the terminal.

In embodiments of the present disclosure, when an image-capturing component of a terminal is detected to be turned on, current spatial position information and/or attitude information of the terminal is determined, and a data connection between the terminal and a wearable device is established. Image data captured by the image-capturing component is sent to the wearable device when the current spatial position information and/or attitude information of the terminal meets a preset condition that is disadvantageous for viewing a screen of the terminal, enabling the wearable device to display the image data synchronously. In this way, in the situation that the terminal is disadvantageous for a user to view its screen, the terminal may send the captured image data to a wearable device. The user may view captured image form the wearable device so see whether such image satisfying. The user may also adjust attitude and position of the terminal based on the viewed image data, thereby improving the quality of captured images.

It should be noted that when displaying image data, the apparatus for displaying image data provided by the embodiments above only takes the functional modules as divided above as an example. In practice, the aforementioned functions may be configured to be achieved by different functional modules; that is internal structure of the apparatus may be divided into different functional modules so as to accomplish all of part of the aforementioned functions. In addition, the apparatus and method for displaying image data provided by the embodiments above pertains to a same conception, its implementation process may be referred to method embodiments, which will not go into further details herein.

Another exemplary embodiment provides a structure block diagram of a terminal. The terminal may be a mobile phone, a tablet and so on.

Figure 7:
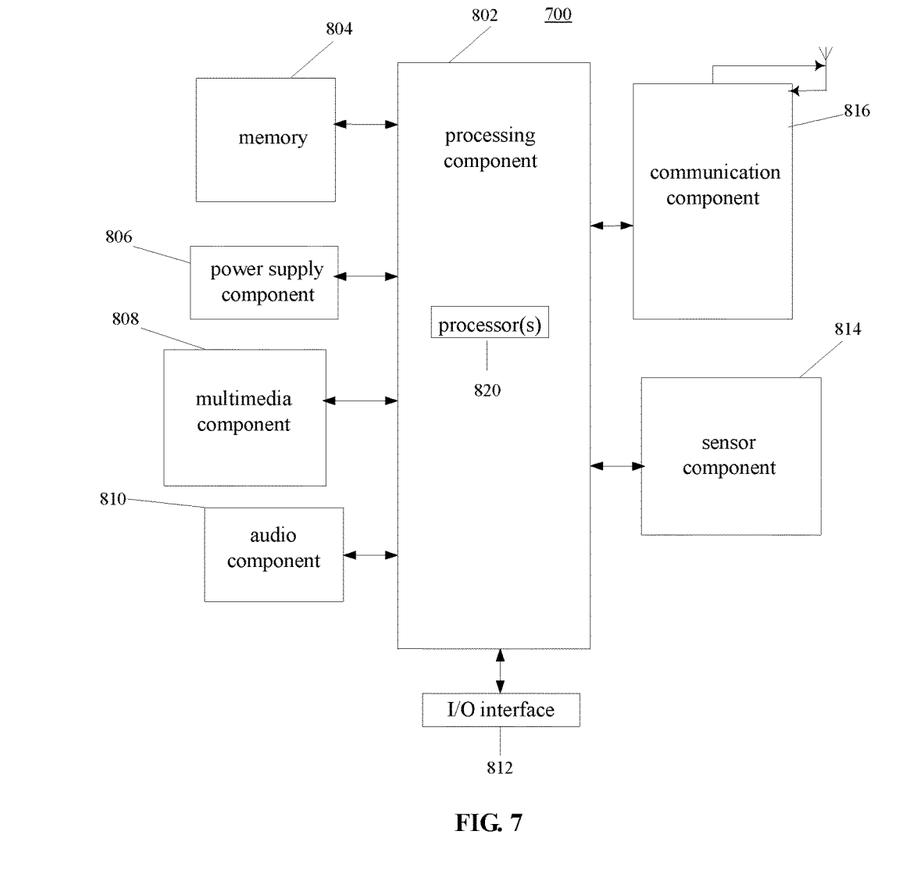
FIG. 7 is a structure block diagram illustrating a terminal according to an exemplary embodiment.

Referring to FIG. 7, the terminal 700 may comprise one or more of the following components: a processing component 802, a memory 804, a power supply component 806, a multimedia component 808, an audio component 810, an input/output (I/O) interface 812, a sensor component 814, and a communication component 816.

The processing component 802 typically controls overall operations of the terminal 700, such as the operations associated with display, telephone calls, data communications, camera operations, and recording operations. The processing component 802 may comprise one or more processors 820 to execute instructions to perform all or part of the steps in the above described methods. Moreover, the processing component 802 may comprise one or more modules which facilitate the interaction between the processing component 802 and other components. For instance, the processing component 802 may comprise a multimedia module to facilitate the interaction between the multimedia component 808 and the processing component 802.

The memory 804 is configured to store various types of data to support the operation of the terminal 700. Examples of such data comprise instructions for any applications or methods operated on the terminal 700, contact data, phonebook data, messages, images, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power supply component 806 provides power to various components of the terminal 700. The power component 806 may comprise a power management system, one or more power sources, and any other components associated with the generation, management, and distribution of power for the terminal 700.

The multimedia component 808 comprises a screen providing an output interface between the terminal 700 and the user. In some embodiments, the screen may comprise a liquid crystal display (LCD) and a touch panel (TP). If the screen comprises the touch panel, the screen may be implemented as a touch screen to receive input signals from the user. The touch panel comprises one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 comprises a front camera and/or a rear camera. The front camera and the rear camera may receive an external multimedia datum while the terminal 700 is in an operation mode, such as a photographing mode or a video mode. Each of the front camera and the rear camera may be a fixed optical lens system or capable of optical focusing and zooming.

The audio component 810 is configured to output and/or input audio signals. For example, the audio component 810 comprises a microphone (MIC) configured to receive an external audio signal when the terminal 700 is in an operation mode, such as a call mode, a recording mode, and a voice recognition mode. The received audio signal may be further stored in the memory 804 or transmitted via the communication component 816. In some embodiments, the audio component 810 further comprises a speaker to output audio signals.

The I/O interface 812 provides an interface between the processing component 802 and peripheral interface modules, the peripheral interface modules being, for example, a keyboard, a click wheel, buttons, and the like. The buttons may comprise, but are not limited to: a home button, a volume button, a starting button, and a locking button.

The sensor component 814 comprises one or more sensors to provide status assessments of various aspects of the terminal 700. For instance, the sensor component 814 may detect an open/closed status of the terminal 700, relative positioning of components (e.g., the display and the keypad of the terminal 700), a change in position of the terminal 700 or a component of the terminal 700, a presence or absence of user contact with the terminal 700, an orientation or an acceleration/deceleration of the terminal 700, and a change in temperature of the terminal 700. The sensor component 814 may comprise a proximity sensor configured to detect the presence of a nearby object without any physical contact. The sensor component 814 may also comprise a light sensor, such as a CMOS or CCD image sensor, for use in imaging applications. In some embodiments, the sensor component 814 may also comprise an accelerometer sensor, a gyroscope sensor, a magnetic sensor, a pressure sensor, or a temperature sensor.

The communication component 816 is configured to facilitate communication, wired or wirelessly, between the terminal 700 and other devices. The terminal 700 can access a wireless network based on a communication standard, such as WiFi, 2G or 3G or a combination thereof. In an exemplary embodiment, the communication component 816 receives a broadcast signal or broadcast associated information from an external broadcast management system via a broadcast channel. In an exemplary embodiment, the communication component 816 further comprises a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the terminal 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as comprised in the memory 804, executable by the processor 820 in the terminal 700, for performing the above-described methods. For example, the non-transitory computer-readable storage medium may be a ROM, a RAM, a CD-ROM, a magnetic tape, a floppy disc, an optical data storage device, and the like.

A non-transitory computer-readable storage medium, instructions in the storage medium, when being executed by a processor of a terminal, enable the terminal to perform a method for displaying image data. The method comprises: when an image-capturing component of a terminal is detected to be turned on, current spatial position information and/or attitude information of the terminal is determined, and a data connection between the terminal and a wearable device is established; image data captured by the image-capturing component is sent to the wearable device to enable the wearable device to display the image data synchronously when the current spatial position information and/or attitude information of the terminal meets a preset condition that is disadvantageous for viewing a screen of the terminal.

Optionally, the step of determining current spatial position information and/or attitude information of the terminal when the image-capturing component of the terminal is detected to be turned on comprises: determining the current spatial position information of the terminal via a infrared sensor when the image-capturing component is detected to be turned on; and/or determining the current attitude information of the terminal via a gyroscope when the image-capturing component is detected as being turned on.

Optionally, the spatial position information is a distance between the terminal and the ground, and the attitude information is an angle between vertical upward direction and shooting direction of the image-capturing component of the terminal. The step of sending the image data captured by the image-capturing component to the wearable device when the current spatial position information and/or attitude information of the terminal meets the preset condition that is disadvantageous for viewing a screen of the terminal comprises: sending the image data captured by the image-capturing component to the wearable device, when the distance between the terminal and the ground is currently less than a predetermined distance threshold value, and/or that the angle between vertical upward direction and shooting direction of the image-capturing component of the terminal is less than a predetermined angle threshold value.

Optionally, the step of sending the image data captured by the image-capturing component to the wearable device comprises: sending the image data captured by the image-capturing component to the wearable device via a Bluetooth component; or sending the image data captured by the image-capturing component to the wearable device via a wireless network.

Optionally, the method further comprises: receiving an image-capturing request sent by the wearable device for performing an image-capturing process; or receiving a recording request sent by the wearable device for performing a recording process.

Optionally, the method further comprises: stopping sending the image data captured by the image-capturing component to the wearable device, when the current spatial position information and/or attitude information of the terminal no longer meets the preset condition that is disadvantageous for viewing a screen of the terminal.

In embodiments of the present disclosure, when an image-capturing component of a terminal is detected to be turned on, current spatial position information and/or attitude information of the terminal is determined, and a data connection between the terminal and a wearable device is established. Image data captured by the image-capturing component is sent to the wearable device to enable the wearable device to display the image data synchronously when the current spatial position information and/or attitude information of the terminal meets a preset condition that is disadvantageous for viewing a screen of the terminal. In this way, in the situation that the terminal is disadvantageous for a user to view its screen, the terminal may send the captured image data to a wearable device. The user may view captured image form the wearable device so see whether such image satisfying. The user may also adjust attitude and position of the terminal based on the viewed image data, thereby improving the quality of captured images.

Other embodiments of the invention will be apparent to those skilled in the art from consideration of the specification and practice of the disclosures herein. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the invention being indicated by the following claims.

It will be appreciated that the inventive concept is not limited to the exact construction that has been described above and illustrated in the accompanying drawings, and that various modifications and changes may be made without departing from the scope thereof. It is intended that the scope of the disclosure to be limited by the appended claims only.

What is claimed is:

1. A method for displaying image data, the method comprising:
    determining current spatial position information and attitude information of a terminal, and establishing a data connection between the terminal and a wearable device when detecting that an image-capturing component of the terminal is turned on;
    sending image data captured by the image-capturing component to the wearable device for displaying the image data synchronously when the current spatial position information and attitude information of the terminal meet a preset condition that is disadvantageous for viewing a screen of the terminal.

2. The method of claim 1, wherein the step of determining current spatial position information and attitude information of the terminal when detecting that the image-capturing component of the terminal is turned on comprises:
    determining the current spatial position information of the terminal via a infrared sensor when detecting that the image-capturing component is turned on; and
    determining the current attitude information of the terminal via a gyroscope when detecting that the image-capturing component is turned on.

3. The method of claim 1, wherein the spatial position information is a distance between the terminal and the ground, and the attitude information is an angle between vertical upward direction and shooting direction of the image-capturing component of the terminal; and
    wherein the step of sending image data captured by the image-capturing component to the wearable device for displaying the image data synchronously when the current spatial position information and attitude information of the terminal meet a preset condition that is disadvantageous for viewing a screen of the terminal comprises:
    sending the image data captured by the image-capturing component to the wearable device when the distance between the terminal and the ground is less than a predetermined distance threshold value, and the angle between vertical upward direction and shooting direction of the image-capturing component of the terminal is less than a predetermined angle threshold value.

4. The method of claim 1, wherein the step of sending the image data captured by the image-capturing component to the wearable device for displaying the image data synchronously comprises:
    sending the image data captured by the image-capturing component to the wearable device via a Bluetooth component or a wireless network.

5. The method of claim 1, wherein the method further comprises:
    receiving an image-capturing request sent by the wearable device for performing an image-capturing process.

6. The method of claim 1, wherein the method further comprises:
    receiving a recording request sent by the wearable device for performing a recording process.

7. The method of claim 1, wherein the method further comprises:
    stopping sending the image data captured by the image-capturing component to the wearable device when the current spatial position information and attitude information of the terminal no longer meet the preset condition that is disadvantageous for viewing the screen of the terminal.

8. An apparatus for displaying image data, the apparatus comprising:
    a processor; and
    a memory for storing processor-executable instructions;
    wherein the processor is configured to:
    determine current spatial position information and attitude information of a terminal and establish a data connection between the terminal and a wearable device when detecting that an image-capturing component of the terminal is turned on; and
    send image data captured by the image-capturing component to the wearable device for displaying the image data synchronously when the current spatial position information and attitude information of the terminal meet a preset condition that is disadvantageous for viewing a screen of the terminal.

9. The apparatus of claim 8, wherein the processor configured to determine current spatial position information and attitude information of a terminal and establish a data connection between the terminal and a wearable device when detecting that an image-capturing component of the terminal is turned on is further configured to:
    determine the current spatial position information of the terminal via a infrared sensor when detecting that the image-capturing component is turned on; and
    determine the current attitude information of the terminal via a gyroscope when detecting that the image-capturing component is turned on.

10. The apparatus of claim 8, wherein the spatial position information is a distance between the terminal and the ground, and the attitude information is an angle between vertical upward direction and shooting direction of the image-capturing component of the terminal; and wherein the processor configured to send image data captured by the image-capturing component to the wearable device for displaying the image data synchronously when the current spatial position information and attitude information of the terminal meet a preset condition that is disadvantageous for viewing a screen of the terminal is further configured to:

send the image data captured by the image-capturing component to the wearable device, when the distance between the terminal and the ground is less than a predetermined distance threshold value, and the angle between vertical upward direction and shooting direction of the image-capturing component of the terminal is less than a predetermined angle threshold value.

11. The apparatus of claim 8, wherein the processor configured to send image data captured by the image-capturing component to the wearable device for displaying the image data synchronously is further configured to:

send the image data captured by the image-capturing component to the wearable device via a Bluetooth component or a wireless network.

12. The apparatus of claim 8, wherein the processor is further configured to:

receive an image-capturing request sent by the wearable device for performing an image-capturing process.

13. The apparatus of claim 8, wherein the processor is further configured to:

receive a recording request sent by the wearable device for performing an recording process.

14. The apparatus of claim 8, wherein the processor is further configured to stop sending the image data captured by the image-capturing component to the wearable device when the current spatial position information and attitude information of the terminal no longer meet the preset condition that is disadvantageous for viewing the screen of the terminal.

15. A non-transitory computer-readable storage medium having instructions stored thereon, the instructions, when executed by a processor, cause the processor to perform a method for displaying image data, the method comprises:

determining current spatial position information and attitude information of the terminal, and establishing a data connection between the terminal and a wearable device when detecting that an image-capturing component of a terminal is turned on;

sending image data captured by the image-capturing component to the wearable device for displaying the image data synchronously when the current spatial position information and attitude information of the terminal meet a preset condition that is disadvantageous for viewing a screen of the terminal.

\* \* \* \* \*